United States Patent [19]
Kalish

[11] 3,847,201
[45] Nov. 12, 1974

[54] AUTOMOTIVE SUN SCREEN FRAME

[76] Inventor: Harold Kalish, 7400 Sabino Vista Dr., Tucson, Ariz. 85715

[22] Filed: Dec. 13, 1973

[21] Appl. No.: 424,357

[52] U.S. Cl.................. 160/105, 160/369, 160/353
[51] Int. Cl............................................... E06b 3/30
[58] Field of Search....... 160/87, 88, 105, 353, 354, 160/368 R, 368 S, 369, DIG.2, 371, 127, 128, 129, 181; 296/146, 148, 152; 49/463

[56] References Cited
UNITED STATES PATENTS

| | | | |
|---|---|---|---|
| 1,430,963 | 10/1922 | Eyquem | 160/88 |
| 2,139,156 | 12/1938 | Gill | 160/353 |
| 2,567,153 | 9/1951 | Jackson et al. | 49/463 |
| 2,682,427 | 6/1954 | Bright | 296/148 |
| 2,917,111 | 12/1959 | Clarke | 160/369 |
| 2,922,473 | 1/1960 | Le Bron | 296/148 |
| 3,204,981 | 9/1965 | Edwards | 160/105 |

*Primary Examiner*—Peter M. Caun
*Attorney, Agent, or Firm*—Cahill, Sutton & Thomas

[57] ABSTRACT

A removable framework for securing sun screens to doors of automobiles is disclosed.

5 Claims, 2 Drawing Figures

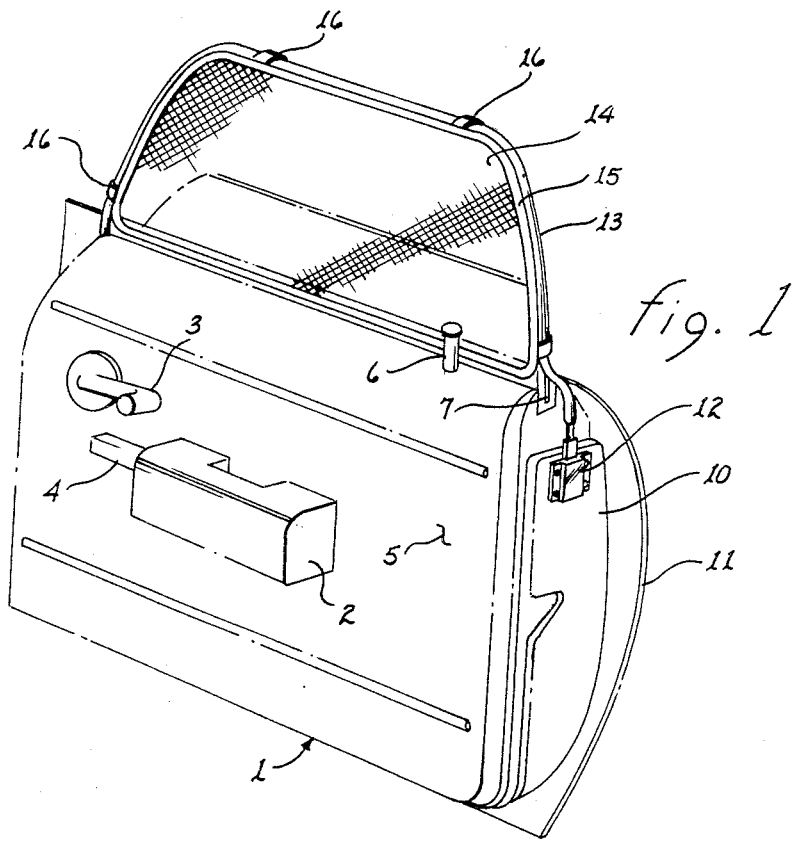
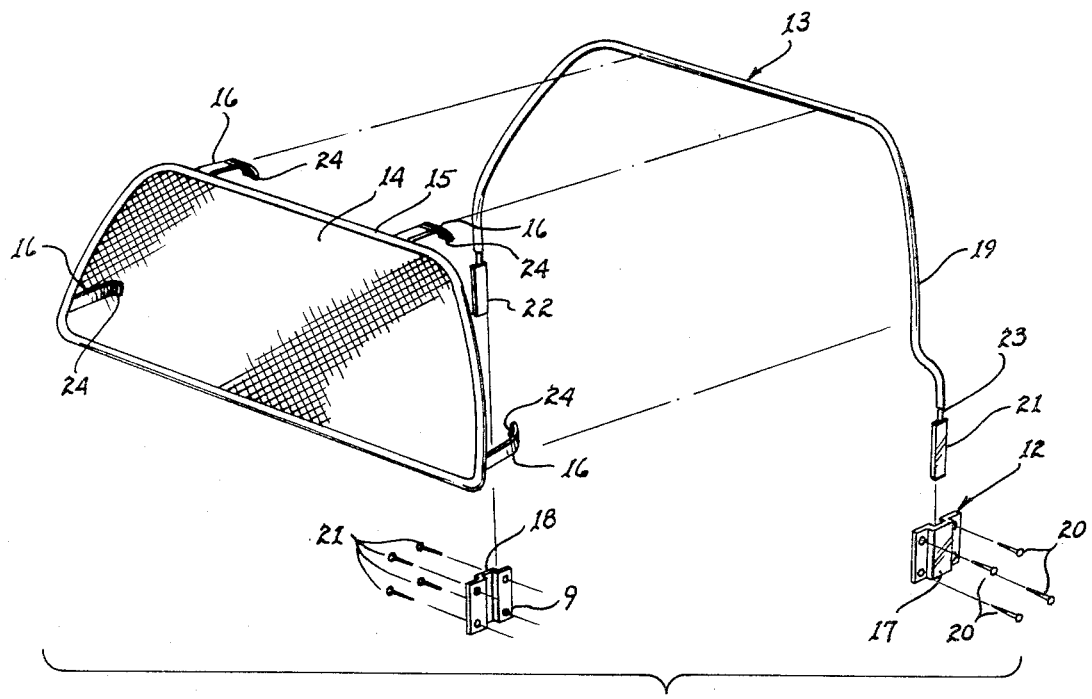

AUTOMOTIVE SUN SCREEN FRAME

The present invention relates to sun screens, and, more particularly, to sun screens mounted within removable frames attachable to doors of automobiles.

In hot climates, such as the southwestern states of the United States, the sun's rays can rapidly deteriorate the interior of automobiles. In addition, the heating effect of the sun's rays within an automobile can, in many cases, be equal to or greater than the cooling capacity of automotive air conditioning units. Thereby, the upholstery and other accouterments deteriorate rapidly and the occupants may be very uncomfortable.

Various devices have been employed in an attempt to restrict the ingress of the sun's rays within automobiles. Earlier, venetian blinds, and the like, were mounted interior to the rear window. However, they could not be used in conjunction with the side windows because of their cumbersome nature. With the advent of new materials, foil-like sheets having miniature louvers were developed. These sheets were generally mounted upon a spring biased roller adjacent the upper horizontal jamb of the automobile doors and in proximity to the top of the window. To use them, the occupants would draw the foil downwardly across the adjacent window and hook the lower edge to a catch extending from the side of the door below the window. A difficulty with this type of mechanism arose because the doors could not be opened without first detaching the lower edge of the sheet from the door.

Recognizing the practical difficulties involved in the rolled sheets, sheet material such as silvered apertured mylar was developed. The mylar could be adhesively attached to each window. Thereby, many of the disadvantages of the roller shades were overcome. Most car doors include various guide mechanisms within the door acting against and guiding the window as it is lowered and raised. The mylar, being attached to the surface of the window, came into contact with the guide mechanisms and was often caught thereon and ultimately torn or otherwise damaged. Thus, the life of the mylar was limited unless the windows were kept rolled up.

Further work with these devices led to the development of sun shades having perforated mylar sheets extending across a preformed framework. The framework was attached by snaps or the like to the door frame extending about the automobile window. Thereby, the doors could be opened without disturbing the sun shade. Similarly, the window could be rolled down and up without damaging the sun shade. However, many presently manufactured cars do not include a frame attached to the door and extending about the window. Thereby, the framed sun shades cannot be used with such automobiles.

It is therefore a primary object of the present invention to provide a universal sun shade useable with all presently manufactured automobiles.

Another object of the present invention is to provide an easily attachable and detachable sun shade for automobiles.

Yet another object of the present invention is to provide a two part detachable sun shade for automobiles.

A further object of the present invention is to provide a detachable door mounted frame for retaining a sun screen contiguous with the door window.

A yet further object of the present invention is to provide a detachable sun screen cooperating with a demountable sun screen frame attached to an automobile door.

These and other objects of the present invention will become apparent to those skilled in the art as the description thereof proceeds.

The present invention may be described with more specificity and clarity with reference to the following drawings, in which:

FIG. 1 illustrates the present invention mounted in position upon an automobile door.

FIG. 2 illustrates an exploded view of the components of the present invention.

A typical automobile door is illustrated in FIG. 1. It includes an arm rest 2 extending inwardly from an interior panel 5, a window crank 3 and a door handle 4. A door lock 6 extends upwardly from the upper edge of inner panel 5 in proximity to window 7. Window 7 is slidably positionable into and out of the main body of door 1 by means of crank 3, as is well known. An outer panel 11 is generally coincident with the main body of door 1 and extends longitudinally from both the front and rear edges thereof. Usually, the extensions of the outer panel 11 mate with adjacent sheet metal about the door jamb and hide the hinge and lock mechanisms of the door.

The present invention is attached to the automobile door 1 in the following manner. A bracket 12 is secured adjacent the rear side 10 of door 1 by means of screws or bolts. A similar bracket 9 (see FIG. 2) is secured to the front side of the door 1. A frame 13 is inserted within the two brackets and thereby secured to the door. The location of the brackets 9 and 13 positions the frame 13 adjacent and interior to the windows. The configuration of frame 13 is generally proportional to but of slightly smaller size than the outline of window 7 when the latter is in its raised position. With such a configuration, the frame 13 will not contact the edges of the door jamb adjacent window 7. Thereby, opening and closing of door 1 with the installed frame 13 will not be impeded and the frame will not be damaged or otherwise misaligned during normal operation of the door.

A sun screen 14, which may be a perforated mylar sheet or film, apertured metallic foil, or similar material for filtering the sun's rays, is mounted within a relatively rigid frame 15. Frame 15 is attached to frame 13 by means of a plurality of straps 16.

The individual members comprising the present invention will be described with particular reference to FIG. 2. Frame 13 may be formed by steel tubing 23 configured to essentially duplicate the outline of the door window when the latter is in extended position. The tubing 23 is encased within a plastic film or coating 19 to prevent corrosion or scratching of the tubing. Further, the plastic coating will tend to deaden any chattering caused by the frame 13 contacting the door jamb. The extremities of tubing 23 are configured as spades 21 and 22. These spades mate with a similarly shaped female center section 17 and 18, respectively.

As discussed above, the brackets 9 and 12 are secured to the front and rear sides of door 1 by means of screws 21 and 20, respectively. These brackets, due to the normal spacing between the door 1 and the adjacent door jamb, will not impede normal operation of the door. With the above arrangement of parts, it is possible to permanently mount brackets 9 and 12 adjacent the respective sides of door 1.

The frame 13 being slidably detachable from brackets 9 and 12, can be attached to the door 1 during the summer when the sun's rays are particularly intensive and yet the frame may be removed when the sun's rays are welcomed.

The sun screen 14 is attachable to frame 13 by means of straps 16. These straps circumscribe the respective parts of frame 13 and include snaps 24 for engagement with mating snaps mounted upon frame 15. In the alternative, metallic clips or similar devices may be substituted for straps 16. Thus, not only may frame 13 be selectively mounted upon door 1, but sun screen 14 may be selectively attached to or detached from frame 13.

From the above description of the present invention, it will become apparent to those skilled in the art that frame 13 may be configured to match the windows of any existing automobile door which does not include an attached window frame. Further, it will become apparent that the present invention does not impede the normal opening and closing of door 1 nor does it impede, restrict, or otherwise encumber the normal and expected opening and closing of the door window. Thereby, it is possible to drive an automobile having the present invention attached to each of the windows while the windows are rolled down to provide the occupants with fresh air and yet impede the discomfort or deterioration caused by the sun's rays.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A selectively detachable apparatus mountable adjacent an extendable automobile window for shading the interior of an automobile; said apparatus comprising in combination:
    A. a pair of brackets, one of said brackets being attached to each end of the automobile door;
    B. a frame mountable within said brackets, said frame extending upwardly from said door and extending generally adjacent the outline of the automobile window when the latter is in the extended position;
    C. a sun screen for filtering the ray of the sun;
    D. frame means for mounting said sun screen; and
    E. strap means for attaching said frame means to said frame; whereby said sun screen is mounted upon the automobile door adjacent the automobile window.

2. The apparatus as set forth in claim 1 wherein the space intermediate said frame and the window is devoid of any support members extending therebetween.

3. The apparatus as set forth in claim 2 wherein said frame defines a boundary proportional to but smaller than the outline of the automobile window.

4. The apparatus as set forth in claim 3 wherein said frame comprises a length of formed tubing and a coating of sound absorbing material.

5. The apparatus as set forth in claim 3 wherein said frame includes a spade at each end thereof and each one of said pair of brackets includes a female section for receiving one of said spades.

* * * * *